United States Patent Office 3,649,671
Patented Mar. 14, 1972

3,649,671
ALKYLCARBAMIC ACID: 4-ALKYLTHIO AND 4-ALKYLSULFONYL ESTERS
Jacqueline S. Kelyman, Midland, Mich., assignor to The Dow Chemical Company, Midland, Mich.
No Drawing. Filed Oct. 23, 1968, Ser. No. 770,057
Int. Cl. C07c 125/06
U.S. Cl. 260—479 C
4 Claims

ABSTRACT OF THE DISCLOSURE

Novel 4-(alkylthio)- and 4-(alkylsulfonyl)-substituted nitrophenyl esters of (lower alkyl)carbamic acid are claimed, corresponding to the formula

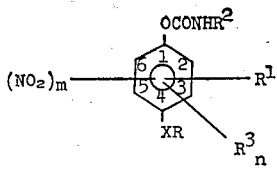

wherein $R^3$ represents hydrogen, lower alkyl, lower alkoxy or halo, $R^1$ represents $R^3$ or $C_{5-8}$ cycloalkyl, $R^2$ and R each represents lower alkyl which may be the same or different, X represents

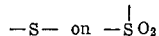

and $m$ and $n$ each represents an integer from 1 to 2. The terms "lower alkyl," "lower alkoxy," "lower alkylthio" and "lower alkylsulfonyl" represent groups containing 1 to 4 carbon atoms, and the term "halo" represents chloro, bromo or iodo. The compounds are useful as pesticides.

SUMMARY OF THE INVENTION

This invention concerns the new compounds 4-(alkylthio)- and 4-(alkylsulfonyl)-substituted nitrophenyl esters of a lower alkyl carbamic acid, represented by the formula

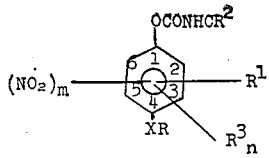

wherein $R^3$ represents hydrogen, lower alkyl, lower alkoxy or halo, $R^1$ represents $R^3$ or $C_{5-8}$ cycloalkyl, $R^2$ and R each represents lower alkyl which may be the same or different, X represents

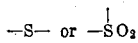

and $m$ and $n$ each represents an integer from 1 to 2. In the present specification and claims, the terms "lower alkyl," "lower alkoxy," "lower alkylthio" and "lower alkylsulfonyl" are employed to represent groups containing from 1, to 2, to 3, to 4 carbon atoms, such as methyl, ethyl, propyl, butyl, methoxy, ethoxy, propoxy, butoxy, methylthio, ethylthio, propylthio, butylthio, methylsulfonyl, ethylsulfonyl, propylsulfonyl and butylsulfonyl; the term "halo" is employed to represent chloro, bromo or iodo; and the term "$C_5$–$C_8$ cycloalkyl" is employed to represent cyclopentyl, cyclohexyl, and cyclooctyl.

The compounds are solids which are soluble in common organic solvents such as, for example, acetone and benzene and slightly soluble in water. They are useful as pesticides for the control of a wide variety of plants including bacterial plants.

Representative 4-alkylthio and 4-alkylsulfonyl nitrophenyl moieties of the novel compounds (the first nitro substituent and the 4-alkylthio or 4-alkylsulfonyl substituent here being omitted for purpose of simplification) include phenyl, lower alkyl halophenyl, lower alkoxy halophenyl, lower alkyl (lower alkoxy)phenyl, cyclopentyl halophenyl, cyclohexyl dihalophenyl and halo nitrophenyl, such as 2,6-dimethylphenyl, 2,3,6-trimethylphenyl,
2-cyclohexyl-6-methylphenyl,
3-butoxy-2-methylphenyl,
2,3,6-trimethoxyphenyl,
2,6-dichlorophenyl,
2-chloro-5-butyloxy-6-methylphenyl,
2-nitro-5-bromophenyl,
6-cyclopentylphenyl,
2,6-diiodo-5-cyclopentylphenyl,
2,5,6-tribromophenyl,
2,6-dichloro-5-isopropoxyphenyl,
2-bromo-6-nitrophenyl and
2-nitro-5-cyclooctylphenyl moieties.

Representative lower alkyl carbamic acid moieties ($R^2$NHCOO) include those wherein $R^2$ is methyl, ethyl, propyl and butyl, e.g., methylcarbamate, ethylcarbamate, propylcarbamate and butylcarbamate.

Representative compounds of the present invention include 2-methoxy-4-(methylsulfonyl)-6-nitrophenyl methylcarbamate,
2-methoxy-4-(butylsulfonyl)-6-nitrophenyl butylcarbamate,
2-isopropoxy-4-(methylsulfonyl)-6-nitrophenyl isopropylcarbamate,
2,3-diethoxy-4-(ethylsulfonyl)-6-nitrophenyl ethylcarbamate,
2,3-di-n-propyl-4-(propylsulfonyl)-6-nitrophenyl propylcarbamate,
2,3,5-triethoxy-4-(ethylsulfonyl)-6-nitrophenyl ethylcarbamate,
2,3,5-tri-n-propyl-4-(n-butylsulfonyl)-6-nitrophenyl n-butylcarbamate,
2-bromo-4-(methylthio)-6-nitrophenyl methylcarbamate,
2,3,5-tribromo-4-(ethylthio)-6-nitrophenyl ethylcarbamate,
2-methyl-4-(methylthio)-6-nitrophenyl methylcarbamate,
2-ethoxy-4-(ethylthio)-6-nitrophenyl ethylcarbamate,
2-methoxy-4-(methylthio)-6-nitrophenyl methylcarbamate,
2-methoxy-3,5-dimethyl-4-(methylthio)-6-nitrophenyl methylcarbamate,
2-methoxy-3,5-dimethyl-4-(n-propylthio)-6-nitrophenyl ethylcarbamate,
4-(methylthio)-2-nitro-3,5-xylyl methylcarbamate,
4-(isobutylthio)-2-nitro-3,5-xylyl n-butylcarbonate,
4-(methylthio)-2,6-dinitrophenyl methylcarbamate,
4-(isobutylsulfonyl)-2-nitro-3,5-xylyl n-butylcarbamate,
4-(methylsulfonyl)-2-nitrophenyl methylcarbamate,
2-methyl-4-(methylsulfonyl)-6-nitrophenyl methylcarbamate,
2-methoxy-4-(methylsulfonyl)-6-nitrophenyl methylcarbamate,
4-(methylsulfonyl)-2-nitro-3,5-xylyl methylcarbamate,
4-(isobutylthio)-2-nitro-3,5-xylyl-n-butylcarbamate,
2-cyclohexyl-4-(methylthio)-6-nitrophenylmethylcarbamate,
2-sec.-butyl-4-(methylthio)-6-nitrophenyl methylcarbamate,
4-(isobutylthio)-6-nitrophenyl methylcarbamate,
2-cyclohexyl-4-(methylsulfonyl)-6-nitrophenyl methyl carbamate and
2-sec.-butyl-4-(methylsulfonyl)-6-nitrophenyl isobutylcarbamate.

The compounds of the present invention are prepared by reacting a lower alkyl isocyanate with a 4-(lower alkylthio)- or a 4-(lower alkylsulfonyl)-substituted nitrophenol. The reaction involves the phenolic hydroxyl group and the isocyanate group whereby an ester linkage is formed, according to the following reaction mechanism:

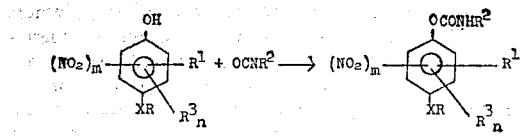

The reaction is conveniently carried out in an inert organic solvent as reaction medium, such as methylene chloride, tetrahydrofuran, benzene, toluene, xylene, carbon tetrachloride, ether, dioxane or mixtures thereof, or in the presence of an excess amount of lower alkyl isocyanate as reaction medium. The amounts of the reagents to be employed are not critical, some of the desired product being obtained when employing any proportions of the reactants. However, the reaction consumes the reactants in equimolar proportions and good yields are obtained when equimolar proportions of the 4-RX-substituted nitrophenol and alkyl isocyanate are employed. The reaction is somewhat exothermic and takes place smoothly at a temperature at which the ester linkage is formed, conveniently at temperatures of from minus 20° up to 100° C. and preferably at temperatures of from 10° to 60° C.

In carrying out the reaction, the reactants are mixed and contacted together in any convenient fashion and the resulting mixture maintained for a period of time in the reaction temperature range. In a preferred embodiment, the yield of the desired product can be increased and the reaction period decreased by the addition of a catalytic amount of a basic material to the reaction mixture. Representative catalysts include, for example, trimethylamine, triethylamine, pyridine, picoline, lutidine and quinoline.

Following the reaction, the reaction mixture is processed by conventional procedures to obtain the desired product. In one such conventional procedure the reaction medium is distilled to separate the volatile material from the desired product. This product can then be employed in pesticidal applications or further purified by such conventional procedures as washing or recrystallization.

DESCRIPTION OF THE PREFERRED EMBODIMENTS

The following examples describe completely representative specific embodiments and the best modes contemplated by the inventor for carrying out the invention.

Example 1.—Methylcarbamic Acid: 2-methoxy-4-(methylsulfonyl)-6-nitrophenyl ester A mixture of 12.4 grams (0.05 mole) 2-methoxy-4-methylsulfonyl-6-nitrophenol, 6 grams methyl isocyanate, 800 milliliters methylene chloride and 4 drops triethylamine is permitted to stand at room temperature for two days. The methylene chloride is removed by evaporation and the solid residue is recrystallized from benzene. There is obtained a white solid, melting at 167°–168.5° C.

Analysis.—Calculated for $C_{10}H_{12}N_2O_7S$ (percent): C, 39.47; H, 3.98; N, 9.21. Found (percent): C, 39.15; H, 4.00; N, 9.05.

Example 2

The following compounds of the present invention are prepared from the indicated starting materials in accordance with the methods herein described.

2 - methoxy - 4 - (methylsulfonyl) - 6 - nitrophenyl methylcarbamate, melting at 167°–168.5° C., by reacting 2 - methoxy - 4 - (methylsulfonyl) - 6 - nitrophenol with methyl isocyanate in the presence of triethylamine as catalyst.

2 - bromo - 4 - (methylsulfonyl) - 6 - nitrophenyl methylcarbamate, melting at 120°–122° C. by reacting 2 - bromo - 4 - (methylsulfonyl) - 6 - nitrophenol with methylisocyanate in the presence of trimethylamine as catalyst.

2 - methyl - 4 - (methylthio) - 6 - nitrophenyl methylcarbamate, melting at 89°–91° C., by reacting 2-methyl-4-(methylthio)-6-nitrophenol with methyl isocyanate in the presence of pyridine as catalyst.

2 - methoxy - 4 - (methylthio) - 6 - nitrophenyl methylcarbamate, melting at 120°–122° C., by reacting 2-methoxy-4-(methylthio)-6-nitrophenol with methyl isocyanate in the presence of picoline as catalyst.

4-(methylthio)-2-nitro-3,5-xylyl methylcarbamate, melting at 121°–123° C., by reacting 3,5-dimethyl-4-(methylthio)-2-nitrophenol with methyl isocyanate in the presence of triethylamine as catalyst.

4-(methylthio) - 2,6 - dinitrophenyl methylcarbamate, melting at 126°–127° C., by reacting 4-(methylthio)-2,6-dinirophenol with methyl isocyanate in the presence of triethylamine as catalyst.

4-(methylsulfonyl) - 2 - nitrophenyl methylcarbamate, melting at 160°–163° C., by reacting 4-(methylsulfonyl)-2-nitrophenol with methyl isocyanate in the presence of triethylamine as catalyst.

2-methyl - 4-(methylsulfonyl)-6-nitrophenyl methylcarbamate, melting at 156°–158° C., by reacting 2-methyl-4-(methylsulfonyl)-6-nitrophenol with methyl isocyanate in the presence of triethylamine as catalyst.

4-(methylsulfonyl)-2-nitro-3,5-xylyl methylcarbamate, melting at 165°–167° C., by reacting 3,5-dimethyl-4-(methylsulfonyl)-2-nitrophenol with methyl isocyanate in the presence of triethylamine as catalyst.

2-cyclohexyl-4-(methylthio)-6-nitrophenyl methylcarbamate, melting at 114°–115° C., by reacting 2-cyclohexyl-4-(methylthio)-6-nitrophenol with methyl isocyanate in the presence of triethylamine as catalyst.

2-sec.-butyl-4-(methylthio)-6-nitrophenyl methylcarbamate, melting at 90°–91° C., by reacting 2-sec.-butyl-4-(methylthio)-6-nitrophenol with methyl isocyanate in the presence of pyridine as catalyst.

2-cyclohexyl-4-(methylsulfonyl)-6-nitrophenyl methylcarbamate, melting at 136°–138° C., by reacting 2-cyclohexyl-4-(methylsulfonyl)-6-nitrophenol with methyl isocyanate in the presence of triethylamine as catalyst.

2-sec.-butyl - 4-(methylsulfonyl)-6-nitrophenyl methylcarbamate, melting at 124°–126° C., by reacting 2-sec.-butyl-4-(methylsulfonyl)-6-nitrophenol with methyl isocyanate in the presence of picoline as catalyst.

4-(methylsulfonyl)-6-nitro-2,3,5-tribromo methylcarbamate (molecular weight 511.0) by reacting 4-(methylsulfonyl)-6-nitro-2,3,5-tribromophenol with methyl isocyanate in the presence of triethylamine as a catalyst.

4-(ethylthio)-2-nitrophenyl ethylcarbamate (molecular weight 270.3) by reacting 4-(ethylthio)-2-nitrophenol with ethyl isocyanate in the presence of pyridine as catalyst.

2,3-dichloro-4-(methylsulfonyl)-6-nitrophenyl methylcarbamate (molecular weight 343.15) by reacting 2,3-dichloro-4-(methylsulfonyl)-6-nitrophenol with methyl isocyanate in the presence of 2,4-lutidine as catalyst.

The nitrophenyl alkylcarbamate esters of this invention are useful as pesticides and antimicrobials for the control of a wide variety of plant pests such as soybeans, peas, tomatoes, beans, German millet, white winter wheat, crabgrass, corn, milo sorghum, Japanese millet, wild oats, pig weeds, cucumbers, radishes, wild mustard-charlock, cotton, barnyard grass, yellow foxtail, morning glory, nutsedge, spiny clotbur, bindweed, alfalfa, apple scab fungus, bean mildew, tomato late blight, two spotted spider mite, *Staphylococcus aureus*, *Pseudomonas aeruginosa*, *Candida albicans*, *Trichophyton mentagrophytes*, *Bacillus subtilis*, *Aspergillus terreus*, *Candida pelliculosa*, *Pullularia pullulans*, *Salmonella typhosa*, acid-fast bacterium, and *Rhizopus nigricans*. This is not to suggest that the compounds claimed and compositions containing them are equally effective at similar concentrations or against the same fungal, bacterial and other plant pests. For such use, the unmodified compounds can be employed. Alternatively, the compounds can be dispersed in an edible solid to prepare animal feed compositions or on an inert finely divided solid to prepare dust compositions. The dust compositions can be dispersed in water with or without the aid of a wetting or dispersing agent, the resulting aqueous dispersions being useful as sprays. In other procedures, the compounds can be employed as a constituent in oil or solvent compositions, or with or without an emulsifying or dispersing agent in solvent-in-water or water-in-solvent emulsions or dispersions which are useful as sprays, drenches or washes.

The exact concentration of the toxic constituent to be employed in the treating compositions is not critical and may vary considerably provided an effective amount of the toxicant is supplied, whether on the plant or plant parts or in the soil, ink, adhesive, cutting oil, textile, paper, wood or other habitat or environment of the organism. Good results are obtained when employing compositions containing controlling or pesticidal concentrations and usually from about 100 to 10,000 parts per million by weight of one or more of the compounds. The concentration of toxicant in liquid compositons generally is from about 1 to 50 percent by weight. Concentrations up to 95 weight percent often are conveniently employed. In dusts, the concentration of the toxicant can be from about 1 to 10 weight percent. In compositions to be employed as concentrates, the toxicant can be present in a concentration of from 5 to 98 weight percent.

In representative operations, each of 4-(methylthio)-2-nitro - 3,5 - xylyl methylcarbamate and 2-cyclohexyl-4-(methylsulfonyl)-6-nitrophenyl methylcarbamate gives complete kills of Staphylococcus aureus, Trichophyton mentagrophytes, Bacillus subtilis, Pullularia pullulans and Rhizopus nigricans when employed in aqueous compositions at a concentration of 1000 parts per million by weight.

In further operations 4-(methylthio)-2,6-dinitrophenyl methylcarbamate gives complete control of rice blast and bean mildew when employed in aqueous compositions at a concentration of 10,000 parts per million by weight and is bactericidal to Staphylococcus aureus, Bacillus subtilis and Salmonella typhosa when employed in aqueous compositions at a concentration of 1500 parts per million by weight.

In still further operations, each of 4-(methylthio)-6-nitro-o-tolyl methylcarbamate and 4-methylsulfonyl)-2-nitrophenyl methylcarbamate is herbicidal to white winter wheat, corn, milo sorghum, and wild oats when employed in aqueous compositions at an application rate of 75 pounds per acre. The second-named toxicant also gives complete control of nutsedge when employed in aqueous compositions at an application rate of 15 pounds per acre.

The alkylthio nitrophenol starting materials are prepared in known ways, conveniently by reacting a nitro thiocyanophenol with a lower alkanol in the presence of a base, advantageously in the presence of a liquid reaction medium, according to the following reaction mechanism:

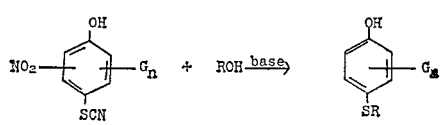

wherein G represents hydrogen, lower alkyl, lower alkoxy, halo or $C_{5-8}$ cycloalkyl, $n$ represents an integer from 1 to 3 and R represents an alkyl group having from 1 to 4 carbon atoms.

The alkylsulfonyl nitrophenol starting materials are prepared in known ways, conveniently by the hydrogen peroxide oxidation of the corresponding alkylthio nitrophenols, advantageously in the presence of glacial acetic acid as solvent reaction medium, according to the following reaction mechanism:

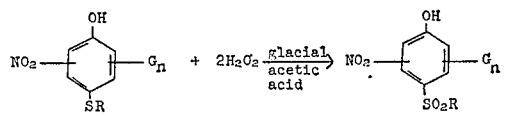

The alkylthiocyano nitrophenols, starting materials for the alkylthio nitrophenols, are also prepared in known ways, such as by the copper thiocyanate process, whereby a thiocyano group is introduced in para-position relative to the phenolic hydroxyl group of an unsubstituted phenol, followed by nitration of the thiocyanophenol in known ways, advantageously with fuming nitric acid at a temperature of 0° to 5° C., conveniently in acetic acid as solvent reaction medium.

Alkyl, alkoxy, halo and cycloalkyl substituted thiocyanophenols containing 1 or 2 nitro groups are advantageously prepared by the Kaufmann method from the corresponding phenols, followed by nitration. According to this method, one mole of a substituted phenol together with excess sodium thiocyanate (more than two moles) is dissolved in glacial acetic acid or methanol saturated with sodium bromide. The mixture is cooled to a temperature of 0° to 5° C. and a solution of one mole of bromine in glacial acetic acid is added to the mixture dropwise with continued stirring. The mixture is allowed to stand at ca. 0° C. for 10 to 15 hours to complete the reaction. The reaction mixture is then stirred with about five times its volume of cold water and the thiocyanophenol separated either as an oil or as a solid. The product thiocyanophenol is further purified by recrystallization from an appropriate solvent. These substituted thiocyanophenols are then nitrated in known ways, advantageously with fuming nitric acid at a temperature of 0° to 5° C., conveniently in acetic acid as solvent reaction medium.

I claim:
1. The compound corresponding to the formula

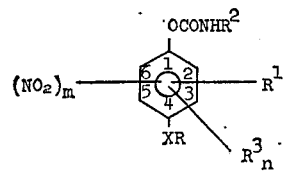

in which $R^3$ represents hydrogen, lower alkyl, lower alkoxy or halo, $R^1$ represents $R^3$ or $C_{5-8}$ cycloalkyl, $R^2$ and R each represents lower alkyl, X represents

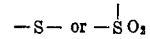

and $m$ and $n$ each represents 1 or 2.

2. The compound of claim 1 wherein $R^2$ is methyl or ethyl.

3. The compound of claim 1 wherein $R^1$ represents hydrogen or 2-cyclohexyl, $R^3$ represents 2-methyl, 2-sec.-butyl, 2-methoxy or 2-bromo, $n$ is 1 and having a nitro group ortho to the ester group.

4. The compound of claim 1 of the group of
2-methoxy-4-(methylsulfonyl)-6-nitrophenyl
methylcarbamate,
4-(methylsulfonyl)-2-nitrophenyl methylcarbamate,
4-(methylthio)-6-nitro-o-tolyl methylcarbamate,
4-(methylthio)-2,6-dinitrophenyl methylcarbamate,
4-(methylthio)-2-nitro-3,5-xylyl methylcarbamate and
2-cyclohexyl-4-(methylsulfonyl)-6-nitrophenyl
methylcarbamate.

References Cited

UNITED STATES PATENTS 3,350,459  10/1967  Pelster et al. _____ 260—609

OTHER REFERENCES

Schegk et al.: Chem. Abstracts, vol. 60 (1964), p. 1644c.

Ishida et al.: Chem. Abstracts, vol. 60 (1964), p. 15776a.

Niessen et al.: Chem. Abstracts, vol. 62 (1965), p. 2173b.

Ishida et al.: Chem. Abstracts, vol. 62 (1965), p. 16121g.

JAMES A. PATTEN, Primary Examiner

U.S. Cl. X.R.

260—454, 607 A, 609 D; 424—300

PO-1050
(5/69)

UNITED STATES PATENT OFFICE
CERTIFICATE OF CORRECTION

Patent No. 3,649,671      Dated 14 March 1972

Inventor(s) Jacqueline S. Kelyman

It is certified that error appears in the above-identified patent and that said Letters Patent are hereby corrected as shown below:

Column 1, line 65, insert --cycloheptyl-- between "cyclohexyl," and "and".

Column 2, line 54, change "n-butylcarbonate," to --n-butylcarbamate,--.

Column 4, line 18, change "dinirophenol" to --dinitrophenol--.

Column 5, line 47, change "4-methylsulfonyl)-2-" to -- 4-(methylsulfonyl)-2- -.

Signed and sealed this 12th day of September 1972.

(SEAL)
Attest:

EDWARD M. FLETCHER, JR.
Attesting Officer

ROBERT GOTTSCHALK
Commissioner of Pate